United States Patent [19]

Minter

[11] Patent Number: 4,977,732
[45] Date of Patent: Dec. 18, 1990

[54] UNEVEN TERRAIN RIDING TRACTOR MOWER

[76] Inventor: William D. Minter, 1906 Jimmie Kerr Rd., Haw River, N.C. 27258

[21] Appl. No.: 498,951

[22] Filed: Mar. 26, 1990

[51] Int. Cl.⁵ ............... A01D 34/64; A01D 34/76; A01D 69/03
[52] U.S. Cl. ............... 56/11.4; 56/11.9; 56/14.7; 56/16.9; 56/DIG. 10; 180/235; 180/242
[58] Field of Search ............... 56/11.4, 11.9, 10.9, 56/14.7, 15.4, 15.7, 15.9, 16.2, 16.7, 16.9; 180/235, 242

[56] References Cited

U.S. PATENT DOCUMENTS

| | | | |
|---|---|---|---|
| 3,402,536 | 9/1968 | Hale et al. | 56/15.7 X |
| 3,408,798 | 11/1968 | Hale et al. | 56/11.9 |
| 3,742,685 | 7/1973 | Lian et al. | 56/11.4 X |
| 3,771,296 | 11/1973 | Sorenson et al. | 56/14.7 X |
| 3,927,510 | 12/1975 | Arnblock | 56/14.7 X |
| 4,514,967 | 5/1985 | Scanland et al. | 56/14.7 |
| 4,679,382 | 7/1987 | Saruhashi et al. | 56/14.7 X |
| 4,876,846 | 10/1989 | Torras | 56/11.9 |
| 4,889,089 | 12/1989 | Fujikawa et al. | 56/14.7 X |

Primary Examiner—Stephen J. Novosad
Attorney, Agent, or Firm—Olive & Olive

[57] ABSTRACT

A powereed riding tractor lawn mower suited to uneven terrain has four fluid motor powered driven wheels and includes a frame comprising front and rear frame sections connected for pivoting about a first axis between the sections and normal to the ground plane. The rear frame section is in turn made up of forward and rearward portions, the rearward portion of which pivots about a second axis which intersects and is perpendicular to the first axis enabling the rear wheels to pivot about both axis. Sterring is accomplished by a steering mechanism which changes the angular relation of the frame sections.

12 Claims, 6 Drawing Sheets

UNEVEN TERRAIN RIDING TRACTOR MOWER

BACKGROUND OF INVENTION

1. Field of Invention

The present invention relates to small tractor type riding mowers and particularly to those adapted for mowing over hilly, uneven, and rough terrain.

2. Background Art

The most common small, four-wheel, riding, tractor type mower provides a unitary frame beneath which the gasoline engine driven mower blade assembly is suspended. Typically, the rear wheels only are driven and the mower deck and front axle may pivot relative to the unitary frame to accommodate to changing terrain. Since the frame is a unitary structure, one portion of the frame is not able to pivot relative to another portion.

In traveling over rough or uneven terrain, it thus would be desirable for all four wheels to be continuously driven, for the rear wheels to be able to pivot around an axis that is generally parallel to the ground and perpendicular to the rear wheel axis, and for the frame to be made up of front and rear sections capable of pivoting relative to each other about a vertical axis so as to better accommodate to the rough or uneven terrain, to slippery ground, and to the need for making relatively tight turns when mowing around shrubbery, trees and the like.

The provision of a riding, tractor type mower having the aforesaid features is the primary object of the present invention. Other objects will become apparent as the description proceeds.

SUMMARY OF INVENTION

A riding tractor mower suited to uneven and rough terrain according to the present invention has four wheels and a four-wheel drive, a frame made up of front and rear sections joined for pivoting around a vertical axis, a pivotal support for the rear wheels enabling the rear wheels to pivot on the rear frame section relative to the front wheels, an arrangement for steering by shifting the angle of the rear frame section relative to the front frame section, a mower assembly suspended below the frame and a gasoline engine supported on the frame which through various drives provide a source of power for driving both the wheels and the mower.

DESCRIPTION OF THE PREFERRED EMBODIMENT

Figure 1:
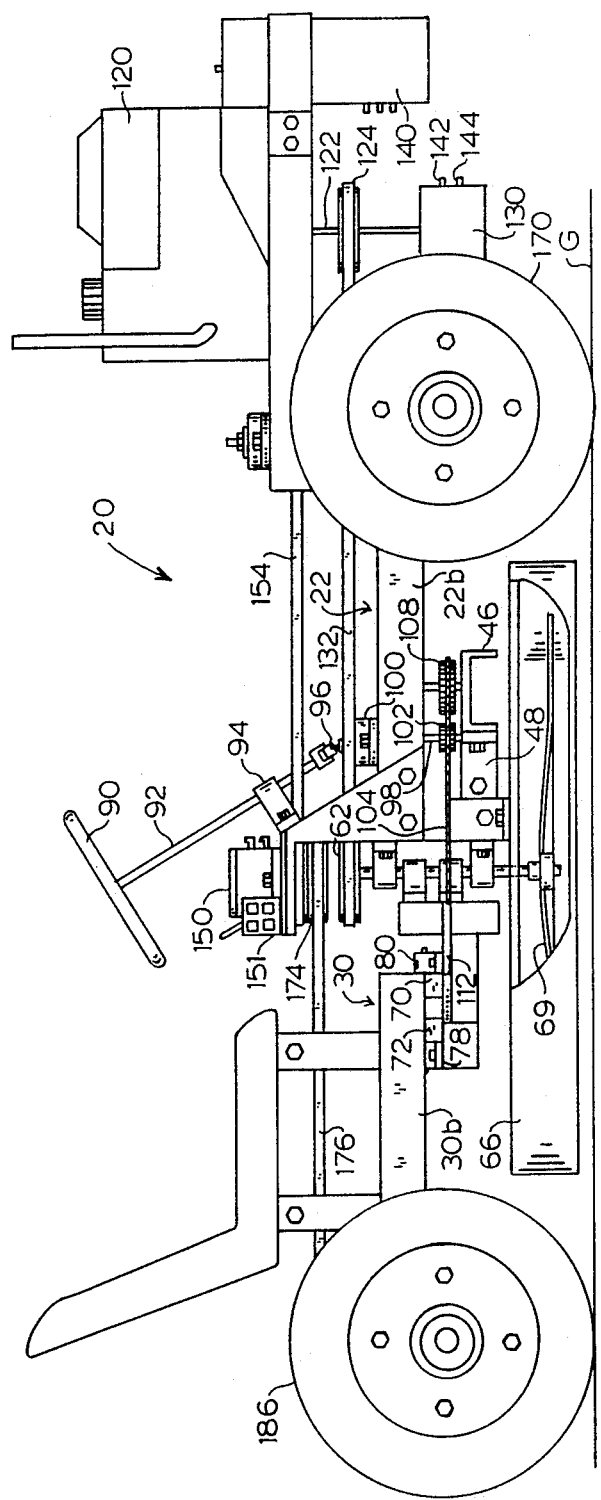
FIG. 1 is a side elevation view of a riding tractor type mower according to the present invention suited to mowing on uneven and rough terrain.
Figure 2:
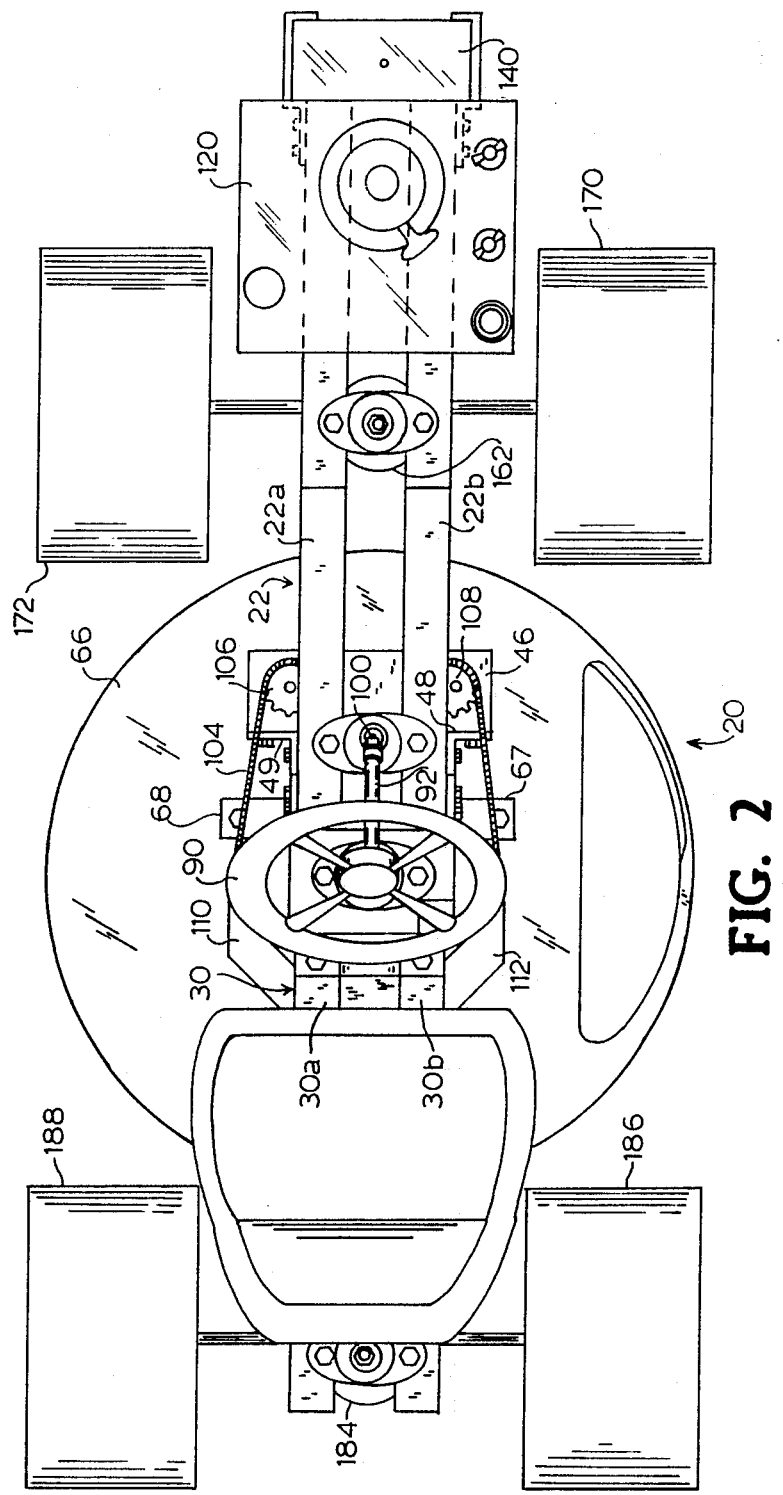
FIG. 2 is a top plan view of the riding tractor type mower shown in FIG. 1.
Figure 3:
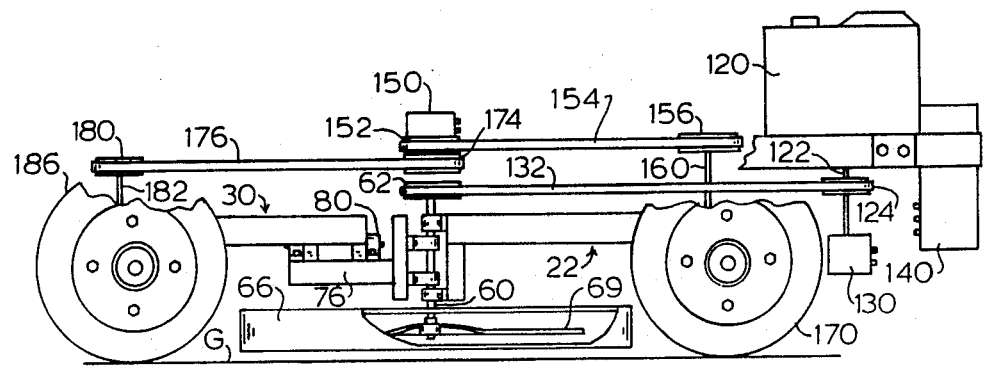
FIG. 3 is a somewhat schematic side elevation view illustrating the basic drive and pivoting arrangements.
Figure 4:
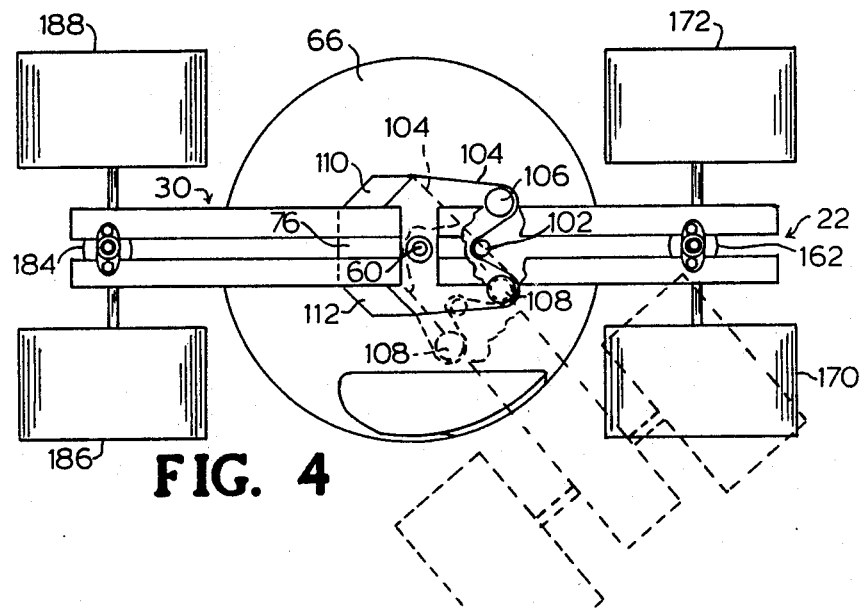
FIG. 4 is a somewhat schematic plan view of the tractor mower of the present invention illustrating in dashed lines how the front frame can be pivoted relative to the rear frame.
Figure 9:
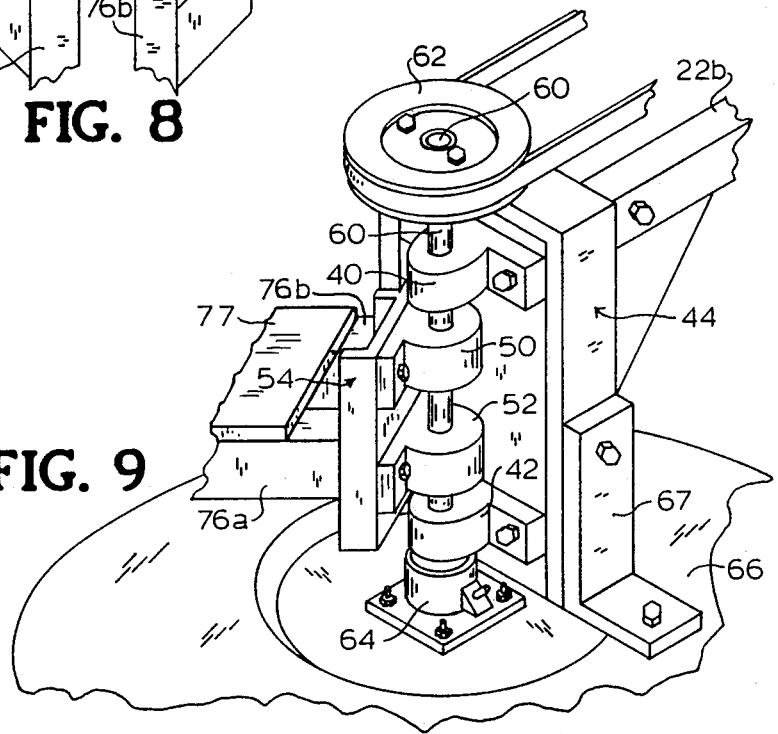
FIG. 9 is a fragmentary perspective view of the pivotal connection between the front and rear frames of the tractor mower with the steering mechanism eliminated for purposes of illustration.

Referring to the drawings, the four-wheel drive riding tractor type mower 20 of the present invention comprises a front frame 22 somewhat schematically illustrated in FIGS. 3 and 4. Front frame 22 comprises a pair of suitably joined elongated front channels 22a, 22b as best illustrated in FIGS. 1 and 2. Front frame 22 has a pivotal connection to a rear frame 30 made up of pivotally joined forward and rearward portions as somewhat schematically illustrated in FIGS. 3 and 4. Rear frame 30 as more specifically illustrated in FIGS. 1 and 2, comprises in a rearward portion a pair of suitably joined rear channels 30a, 30b. The referred to pivotal connection between front frame 22 and rear frame 30 includes a pair of upper and lower bearings 40, 42 mounted on a sub-frame 44 (FIG. 9) secured to front frame 22, a pair of upper and lower bearings 50, 52 secured to a sub-frame 54 forming part of rear frame 30. A vertical shaft 60 defines a first pivotal axis passing through bearings 40, 42, 50, 52. In the illustrated embodiment shaft 60 serves both as a pivotal axis and as a drive shaft mounting a drive pulley 62. Shaft 60, in the illustrated embodiment, passes through another bearing 64 on the mower deck 66 supported by a pair of brackets 67, 68 and which are secured to the sub-frame 44 (FIG. 9). The mower blade 69, partially shown in FIG. 1, is driven by shaft 60 which provides the first pivotal axis and completes a pivotal action between the front and rear frame sections 22, 30. Also to be noted that in the illustrated embodiment this first pivotal axis passes through the center of blade 69 and is substantially midway between the axles of the front and rear wheels. In other embodiments, the mower assembly could be driven by an additional shaft separate from the shaft which provides the first pivotal axis.

Figure 6:
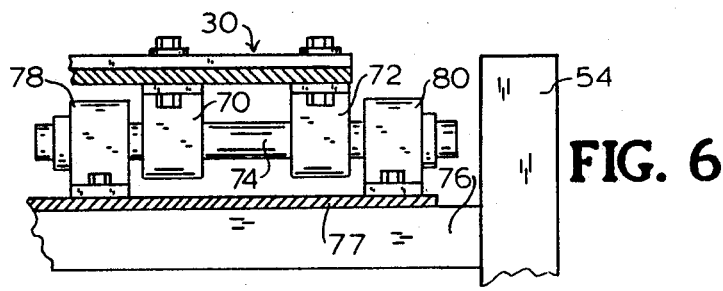
FIG. 6 is an enlarged fragmentary side elevation view illustrating the manner in which the rearward portion of the rear frame is mounted for pivoting relative to the forward portion of the rear frame with portions of the frame cut away for purposes of illustration.
Figure 5:
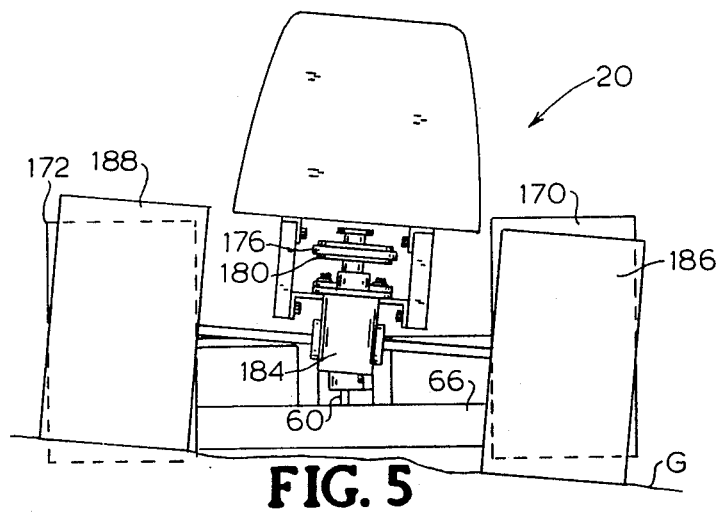
FIG. 5 is a rear elevation view of the tractor mower of the present invention illustrating how the rear wheels are able to pivot about an axis parallel to the ground to accommodate to rough or uneven terrain.
Figure 10:
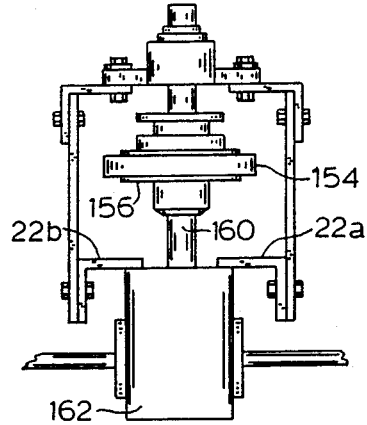
FIG. 10 is an enlarged fragmentary elevation view of the front wheel gear box drive arrangement and illustrative also of the type gear box drive used for the rear wheel drive.

The rear portion of rear frame 30 supports a pair of bearings 70, 72 (FIG. 6) and a sub-frame 76 supported by sub-frame 54. Sub-frame 76 includes channels 76a, 76b (FIG. 9) joined by a plate 77 (FIG. 6). An additional set of bearings 78, 80 mount on plate 77 secured to sub-frame 76. Bearings 70, 72, 78 and 80 receive shaft 74 and thus provide a means for the rearward portion of rear frame 30 to pivot relative to the forward portion of rear frame 30 about a second pivotal axis defined by shaft 74 which is substantially parallel to the ground plane G and perpendicular to the rear wheel axis as best illustrated in FIG. 5.

Figure 8:
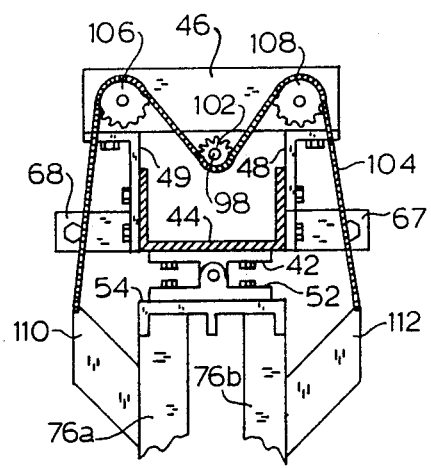
FIG. 8 is a fragmentary plan view illustrating the gear-chain arrangement operated by the steering wheel, shown in FIG. 7, for steering the tractor mower of the present invention.

Steering is accomplished in a particularly unique manner. Making reference to FIGS. 1, 2, 7 and 8 in particular, steering wheel 90 turns drive shaft 92 suitably supported in frame mounted bearing 94 and through universal joint connection 96 drives shaft 98 mounted in frame supported bearing 100 so as to turn a small spur gear 102 (FIG. 8). Gear 102 through a chain 104 turns another pair of spur gears 106, 108 mounted on plate 49. Plate 49 is secured to subframe 44 by angle brackets 48, 49 (FIG. 8). As best illustrated in FIG. 8, the terminal ends of chain 104 are connected to metal plates 110, 112 which are welded to the respective subframe members 76a, 76b. Thus, when steering wheel 90 is turned in a clockwise direction as viewed looking down on the steering wheel, front frame section 22 is caused to steer to the right, as illustrated in FIG. 4, and when steering wheel 90 is turned in a counter clockwise direction, front frame section 22 is caused to steer to the left.

Power is provided by a small gasoline engine 120 which through a drive shaft 122 drives a pulley 124 and also drives an oil pump 130. Conventional start/stop, choke and speed control mechanisms, while not shown, may be employed. Pulley 124 through a belt 132 drives pulley 62 which through drive shaft 60 drives the mower blade 69 in the mower deck 66. While only a single blade 69 is shown, it is to be understood that the mower assembly could have a greater number of blades. A conventional lever operated belt tightening pulley, while not shown, may also be employed for engaging and disengaging the blade drive.

Figure 11:
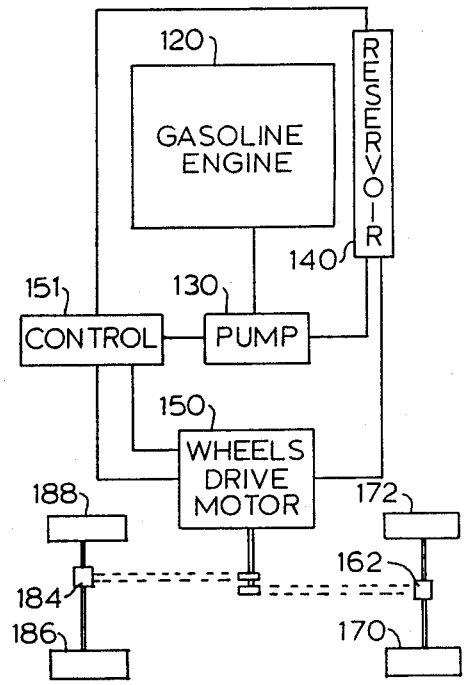
FIG. 11 is a schematic and generalized diagram of a hydraulic system used with the invention.
Figure 7:
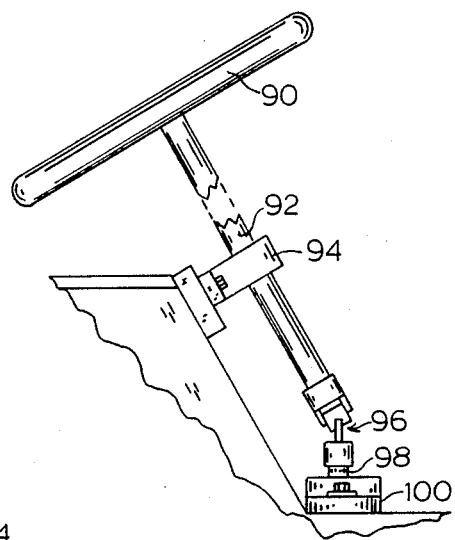
FIG. 7 is a fragmentary elevation view illustrating the steering wheel drive arrangement.

Oil pump 130 has an input connection 142 to oil reservoir 140 and an output connection 144 to an oil motor 150 through a control 151. The line connections are only indicated in FIG. 11 in order to simplify the drawings. Oil motor 150 drives pulley 152 which through belt 154, pulley 156 and drive shaft 160 drives a front gear box 162 which drives a pair of front wheels 170, 172. Pulley 174, also driven by oil pump 150, drives belt 176 which in turn drives pulley 180 and drive shaft 182 to drive the rear wheel gear box 184 which drives a pair of rear wheels 186, 188. Thus, all four wheels are hydraulically driven thereby providing both an inherent shock absorber and the ability to accommodate to slippery surfaces affecting less than all of the four wheels. The illustrated conventional control 151 in FIG. 11 and also shown in FIG. 1 enables the pressurized fluid produced by pump 130 to be directed to oil motor 150 for forward or reverse drive or to be directed to reservior 140 without energizing motor 150. Since such hydraulic systems are conventional and well known, no further detail is deemed necessary.

Figure 12:
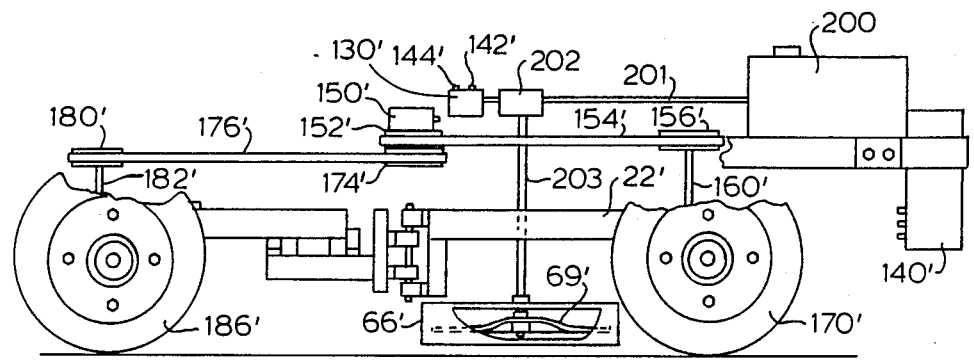
FIG. 12 is a somewhat schematic side elevation view illustrating the basic drive and pivoting arrangements of a second embodiment of the invention riding tractor type mower.

In an alternative embodiment, a small horizontal engine 200 is mounted on front frame 22' as somewhat schematically illustrated in FIG. 12. A small gasoline engine 200 provides power through horizontal drive shaft 201 and gear box 202 which drives both oil pump 130' and through vertical drive shaft 203 mower blade 69'. In this embodiment, mower deck 66' and mower blade 69', of somewhat smaller size, are suspended from front frame 22' between the pivotal axis joining the front and rear frames 22', 30' and the front wheels 170', 172'. Front frame 22' and rear frame 30' are thus still free to pivot and rotate about their connecting pivotal axis as in the first embodiment.

As in the first embodiment, oil pump 130' has an input connection 142' to the oil reservoir 140' and an output connection 144' to the oil motor 150' through a control 151' (not shown). Oil lines are not shown to simplify the drawings. Oil motor 150' drives pulley 152' which through belt 154', pulley 156' and drive shaft 160' drives a front gear box (not shown) which drives a pair of front wheels 170', 172' (not shown). Pulley 174' also driven by oil pump 150', drives belt 176' which in turn drives pulley 180' and drives shaft 182' to drive a rear wheel gear box (not shown) which drives a pair of rear wheels 186', 188' (not shown). Thus, as in the first embodiment, all four wheels are hydraulically driven thereby providing both an inherent shock absorber and the ability to accommodate to slippery surfaces affecting less than all of the four wheels. As in the first embodiment, the control enables the pressurized fluid produced by the pump to be directed to the oil motor for forward or reverse drive or to be directed to the reservoir without energizing the motor.

What is to be particularly recognized is that there is now available a four wheel drive, riding tractor mower capable of sharp turns and of being able to readily accommodate to rough and uneven terrain.

The foregoing embodiments and examples are to be considered illustrative rather than restrictive of the invention, and those modifications which come within the meaning and range of equivalence of the claims are to be included therein.

What is claimed is:

1. A riding tractor lawn mower particularly adapted for mowing on uneven terrain, comprising:
    (a) a frame structure having elongated front and rear frame sections, each frame section having a front end and a rear end;
    (b) pivotal connecting means joining the rear end of said front frame section to the front end of said rear frame section for pivoting about a first axis located between said sections and oriented substantially perpendicular to the ground plane over which the tractor travels;
    (c) a power source mounted on said frame structure and including a powered shaft;
    (d) a front wheel assembly mounted on and below the front end of said front frame section and including a pair of front wheels each of which is mounted on an axle;
    (e) a rear wheel assembly mounted on and below a rear end of said rear frame section and including a pair of rear wheels each of which is mounted on an axle;
    (f) first drive means powered by said powered shaft and operative for simultaneously and continuously driving said front and rear wheels;
    (g) a steering assembly including a steering wheel, a steering drive shaft mounted on said front frame section and operated by rotating said steering drive shaft and a steering linkage operated by said drive shaft and connected to said frame sections in a manner enabling the angular relation of said rear and front frame sections to be changed by rotation of said steering wheel to effect pivoting of said frame sections about said first axis to effect steering of the tractor;
    (h) a mower assembly including a housing supported by and mounted below said frame structure and at least one mower blade rotatably mounted within said housing; and (i) second drive means powered by said powered shaft and connected for driving said blade.

2. A riding tractor lawn mower as claimed in claim 1 wherein said rear frame section includes a forward frame portion mounted to pivot only about said first axis and a rearward frame portion forming a rearward extension of said forward frame portion and pivotally mounted on said forward frame portion in a manner enabling said rearward frame portion to pivot with said first frame section about said first axis and additionally to pivot about a second axis intersecting and perpendicular to said first axis, said rear wheels being mounted on said rearward frame portion thereby enabling said rear wheels to pivot about both said first and second axis.

3. A riding tractor lawn mower as claimed in claim 1 wherein said power source comprises a fuel powered engine, said first drive means comprises a hydraulic drive assembly including a fluid reservoir, a fluid pump driven by said engine and having an intake connection to said reservoir, a fluid motor having an output shaft, an intake connection to said fluid pump enabling said output shaft to be driven by pressurized fluid received from said pump, and an exhaust connection to said reservoir, a hydraulic control including fluid connections to said reservoir, pump and motor and arranged so as to enable fluid pumped by said pump to be selectively transmitted to said fluid motor or to be returned to said reservoir without energizing said motor and second drive means powered by said fluid motor output shaft for driving said wheels.

4. A riding tractor lawn mower as claimed in claim 1 wherein said first axis intersects and passes through said housing.

5. A riding tractor lawn mower as claimed in claim 1 wherein said first axis is located substantially midway the axles of said front and rear wheels.

6. A riding tractor lawn mower as claimed in claim 1 wherein said mower blade comprises a single blade and said first axis intersects and passes through the center of said single blade.

7. A riding tractor lawn mower as claimed in claim 1 wherein said steering linkage includes a gear driven by said steering drive shaft and a chain linkage driven by said gear and extending between said frame sections, movement of said linkage being operative to change the angular relation of said frame sections.

8. A riding tractor lawn mower as claimed in claim 1 wherein said power source comprises a fuel powered engine mounted on said front frame section proximate the front end thereof.

9. A riding tractor lawn mower as claimed in claim 1 wherein said mower assembly housing is mounted so as to reside below both said front and rear frame sections.

10. A riding tractor lawn mower as claimed in claim 1 wherein said mower assembly is mounted forward of said first axis.

11. A riding tractor lawn mower as claimed in claim 3 wherein said second drive connection comprises a belt-pulley type drive, said front and rear wheels are each mounted on axles connected to be driven through a gear box drive mounted between each said pair of front and rear wheels and said belt-pulley drive is connected to drive said gear box drives.

12. A riding tractor lawn mower as claimed in claim 3 wherein said fluid pump is driven directly by said powered shaft, said powered shaft mounts a pulley, at least one blade is driven through a belt connection to said powered shaft pulley, and said front and rear wheels are driven through separate belt connections to said fluid motor output shaft.

* * * * *